(12) United States Patent
Waidele

(10) Patent No.: US 7,462,399 B2
(45) Date of Patent: Dec. 9, 2008

(54) COATING METHOD FOR PLUMBING ARTICLES

(75) Inventor: Armin Waidele, Alpirsbach (DE)

(73) Assignee: Hansgrohe AG, Schiltach (DE)

( * ) Notice: Subject to any disclaimer, the term of this patent is extended or adjusted under 35 U.S.C. 154(b) by 443 days.

(21) Appl. No.: 10/547,945

(22) PCT Filed: Mar. 2, 2004

(86) PCT No.: PCT/EP2004/002055

§ 371 (c)(1),
(2), (4) Date: Apr. 26, 2006

(87) PCT Pub. No.: WO2004/078865

PCT Pub. Date: Sep. 16, 2004

(65) Prior Publication Data

US 2006/0216530 A1   Sep. 28, 2006

(30) Foreign Application Priority Data

Mar. 6, 2003 (DE) ................................ 103 11 001

(51) Int. Cl.
*B05D 5/00* (2006.01)
*B32B 9/04* (2006.01)

(52) U.S. Cl. ................. 428/450; 428/141; 428/142; 428/447; 427/287

(58) Field of Classification Search .............. None
See application file for complete search history.

(56) References Cited

U.S. PATENT DOCUMENTS 3,515,670 A   6/1970  Brown 6,395,826 B1   5/2002  Mager et al.
6,403,164 B1   6/2002  Jonschker et al.

FOREIGN PATENT DOCUMENTS

| DE | 100 04 132 A1 | 1/2000 |
|---|---|---|
| DE | 101 34 473 A1 | 7/2001 |
| DE | 101 02 739 A1 | 7/2002 |
| EP | 0 309 349 A1 | 3/1989 |
| EP | 0 669 385 A1 | 8/1995 |
| EP | 1 127 930 A1 | 8/2001 |
| JP | 63-291665 A * | 11/1988 |
| JP | 10183376 A | 12/1996 |
| JP | 09085880 A | 3/1997 |
| JP | 2001048678 A | 2/2001 |
| JP | 2005-68503 A * | 3/2005 |

OTHER PUBLICATIONS

English Translation of PCT Written Opinion, Feb. 22, 2006.
German Search Report, Nov. 25, 2003.

* cited by examiner

*Primary Examiner*—Marc S Zimmer
(74) *Attorney, Agent, or Firm*—Duane Morris LLP

(57) ABSTRACT

The invention relates to a method for coating plumbing articles such as plumbing fixtures, which have stainless steel surface or surfaces with a so-called stainless steel appearance. According to the invention, at least one siloxane is applied to at least a portion of the surfaces and, to be precise, essentially only in the recesses, channels, grooves and the like, which are provided in the surfaces, while being coated or filled with the siloxane. The coated surfaces are preferably ones that have been subjected to a prior surface treatment, particularly ones that have been brushed.

15 Claims, No Drawings

COATING METHOD FOR PLUMBING ARTICLES

The invention relates to a method for coating plumbing articles, such as plumbing fixtures, and the plumbing articles which can be produced by this method.

Plumbing articles are known to have particularly high requirements for their use in the intended manner, particularly in the bathroom and kitchen, both from the functional point of view and decorative point of view. Thus, to name but a few of the technical requirements, the plumbing articles must be highly corrosion-resistant, must be easy to clean and must be scratch-resistant. At the same time, the plumbing articles must satisfy the decorative demands which are made by the customer, particularly in the bathroom and kitchen.

The problems described also relate in particular to stainless steel products and products which have a so-called stainless steel appearance. Thus, for example, stainless steel fixtures are manufactured and showers, connecting parts and accessories having a stainless steel appearance are produced in the plumbing sector. This stainless steel appearance can be achieved, for example, on a base body comprising plastic by coating with certain metals or metal alloys which give a noble metal appearance. Both in the case of solid stainless steel articles and in the case of articles having a stainless steel appearance, the stainless steel character is properly displayed only by a mechanically treated surface. The mechanical treatment can preferably be effected by brushing.

However, the original appearance of stainless steel products or products having a stainless steel appearance experiences an undesired transformation through daily use. The surface loses its shine and becomes spotted. Fingerprints and hand prints frequently can no longer be completely removed since in particular aggressive perspiration from hands which is present in the brush channels or grooves leads to partial corrosion there. The resulting degradation products can scarcely be removed without damaging the surface. Owing to the surface structure, adhering grease, food and lime residues can be eliminated only with such difficulty that the original convincing surface is scarcely recognizable any more.

In the prior art, attempts have been made to date to solve the problems described by a conventional coating process. Transparent protective lacquers, such as acrylic lacquers, epoxy lacquers, polyurethane lacquers or polysiloxane lacquers, are sprayed onto clean surfaces and are crosslinked, generally by a heating process. Accordingly, the entire surface of the plumbing article is coated with the protective lacquer. However, this is associated with some disadvantages. Thus, the actual surface (stainless steel, stainless steel appearance) no longer appears directly to the observer. Furthermore, the technical properties, such as corrosion resistance, scratch resistance, abrasion resistance and the like, are no longer determined by the metallic surface but by the protective lacquer coat. Finally, there is always the danger that the protective lacquer coat will flake off since it is present over the entire surface and accordingly offers a large area of attack for damage.

It is the object of the invention to avoid the disadvantages of the prior art which have been described. In particular, it is intended to provide an improved method by means of which the original appearance of plumbing articles of stainless steel or having a stainless steel appearance can be obtained. The corresponding plumbing articles should to a particular extent be insensitive to dirt, insensitive to fingerprints, resistant to cleaning agents and easy to clean.

This object is achieved by the method having the features of claim 1 and by the plumbing article having the features of claim 11. Preferred embodiments of this method and of this article are described in the dependent claims 2 to 10 and 12 to 15, respectively. The wording of all claims is hereby incorporated in this description by reference.

By means of the method according to the invention, plumbing articles, such as plumbing fixtures, which have stainless steel surfaces or surfaces having a so-called stainless steel appearance are coated. At least one siloxane is applied to at least a part of the surfaces, in particular in such a way that substantially only the recesses, channels, grooves and the like which are present in the surfaces are coated or filled with the siloxane. This means, in other words, either no siloxane or only a very thin siloxane coat is present outside the recesses and the like. This distinguishes the invention from the prior art, in which a cohesive protective lacquer coat is applied over the total surfaces, at least in the µm range. In comparison, substantially only the recesses and the like are coated with the siloxane or filled with the siloxane in the invention.

In the method according to the invention, it is preferable if the surfaces to be coated are those which have been mechanically (surface-)treated. As mentioned at the outset, the stainless steel character, in particular the visual appearance thereof, is properly displayed in the case of such surfaces. The mechanical surface treatment can be effected, for example, by grinding, for example using a suitable abrasive paper. Another possibility for the surface processing is so-called blasting. The person skilled in the art is known to understand this as meaning a mechanical surface treatment in which, for example, (quartz) sand or glass beads as the blasting medium (diameter usually from 0.5 to 1.5 mm) is or are accelerated with the aid of compressed air blowers onto the corresponding surface. The surface structures characteristic of blasting and having the corresponding recesses form thereby.

A particularly preferred type of surface treatment is so-called brushing. According to the invention, the surface is processed by means of a brush or an identically acting processing means of sufficient strength and hardness with partial abrasion of the surface. As a result of this process, the characteristic structures, such as recesses, channels, grooves and the like, as are characteristic of such processing with brushes which is known to a person skilled in the art, are introduced into this surface.

According to the invention, brushing, blasting and optionally other surface processing methods can be used alternatively or in combination in the invention. Preferably, at least a part of the surface subsequently to be coated is brushed, in particular those parts of the surfaces which can be reached and processed with the brush/brush disk only with difficulty then being blasted.

In a first group of embodiments preferred according to the invention, the siloxane is applied to stainless steel surfaces. These can in principle be stainless steel surfaces which have been applied as a coating to a base body comprising another metal or comprising plastic. However, the cases where the plumbing article itself is produced from (solid) stainless steel should be singled out. In this case, the siloxane is applied directly to the stainless steel article.

In a second group of preferred embodiments, the siloxane is applied to surfaces having a stainless steel appearance. As already explained at the outset, these are surfaces which do not consist of stainless steel but have the appearance (give the visual impression) of stainless steel. In particular, these are metal coatings which have been applied to a base body comprising another metal or comprising plastic. Particularly noteworthy metal coatings having a stainless steel appearance are nickel-tungsten layers and/or palladium-nickel layers. Coatings of such alloys are known in principle to the person skilled in the art. The stainless steel appearance, and in these cases also stainless steel-like technical properties, such as corrosion resistance and the like, are achieved by applying top layers of these alloys to metallic base bodies or base bodies comprising plastic. Where it is intended in these cases also to achieve the appearance of surface-treated, in particular brushed stainless steel, layers of other metals, such as copper or nickel, which are present below the nickel-tungsten or palladium-nickel layers, are frequently brushed. The brushed structure is then retained on application of the thin top layers of said alloys. The siloxane used according to the invention differs from the polysiloxane protective lacquers already known in that, in contrast to the prior art, complete crosslinking/polymerization does not take place. The siloxane optionally present in oligomeric form is not converted into a polysiloxane by thermal aftertreatment. Preferably, the siloxane is used as a so-called sol-gel system, the starting material being known to be hydrolyzable inorganic compounds. Particularly widely used here are alkoxides of titanium, aluminum, zirconium and silicon. These compounds are hydrolyzed in a first reaction step (reaction with water in the presence of catalysts). This hydrolysis leads to a reactive intermediate, the so-called sol. The hydrolyzed compounds are present as colloidal particles in this sol. The sol can then serve as a coating system. As already mentioned, however, substantially no subsequent specific condensation reaction to give polymeric compounds, for example by the use of higher temperatures (heating), takes place in the invention, in comparison with the prior art.

The siloxane used according to the invention is preferably present as an aqueous and/or alcoholic suspension or solution. A preferred alcoholic solvent is ethanol. Very generally, the content of siloxane in the corresponding solution or suspension is more than 10% by weight, contents of from 30% by weight to 60% by weight being more preferred. In the solution or suspension, the (optionally oligomeric) siloxane is protected by the solvent from (further) polymerization. The siloxane then hardens through evaporation of the solvent, and a chemical (crosslinked) reaction takes place, if at all, only to a small extent. After evaporation of the solvent, the siloxane is chemically resistant and cannot be converted back into a solution or suspension, for example by means of ethanol. According to the invention, a very wide range of siloxanes can in principle be used. They are preferably so-called cyclic siloxanes, and the siloxane octamethylcyclotetrasiloxane is to be singled out within this group.

In the method according to the invention, it is preferable to adopt a procedure in which the siloxane is applied to the corresponding surfaces and distributed over them. Consequently, the siloxane can penetrate into the recesses, channels, grooves and the like which are present and can fill them or can coat the surfaces present there. In order to support this process, deliberate pressing, for example with a corresponding apparatus or a cloth, can be effected. Such a cloth may already have also been used for the application. In this context, it is also possible to state that the siloxane is rubbed into the corresponding surfaces. It is of course advantageous if the cloth is a substantially lint-free cloth. The so-called microfiber cloths, as also used in the household, may be mentioned here in particular.

According to the invention, the surface to be coated can of course be cleaned before application of the siloxane, in order to remove dirt, lint and the like from the recesses, channels, grooves, etc. Expediently, the cleaning agent should then be completely removed and the surface dried.

The plumbing articles according to the invention, the stainless steel surfaces or surfaces having a stainless steel appearance are characterized in that substantially only the recesses, channels, grooves and the like which are present in these surfaces are coated or filled with at least one siloxane. The statements made in relation to the method according to the invention are hereby incorporated by reference and are referred to.

The stainless steel surfaces or surfaces having a stainless steel appearance preferably have the structure of a mechanical surface treatment. This may be, for example, the surface structure which arises on blasting, in particular sand blasting. Preferably, the plumbing articles coated according to the invention have a so-called brushed structure, as was already explained above.

In a first group of preferred embodiments, the plumbing articles according to the invention are coated with stainless steel or in particular made of stainless steel. In a second group of preferred embodiments, the stainless steel appearance is achieved by providing the plumbing articles according to the invention with a nickel-tungsten coating or a palladium-nickel coating. Here too, the statements relating to the method according to the invention are hereby incorporated by reference and are referred to.

The siloxane which is present in the plumbing articles according to the invention as a coating or filling in the recesses, channels, grooves and the like which are present is preferably an oligomeric siloxane product. It is not a crosslinked or completely polymerized polysiloxane as in the protective coats as known from the prior art. The siloxane is preferably a so-called cyclic siloxane, in particular octamethylcyclotetrasiloxane.

The described method according to the invention and the described plumbing articles which can be produced therewith have decisive advantages over the prior art. Thus, the method can be carried out in a simple manner by a corresponding treatment of the surfaces to be coated. Crosslinking, for example by heat treatment as in the case of the protective lacquers used to date, is not required. Owing to the fact that the siloxane which has not completely polymerized is present substantially only in the recesses and the like which are present in, or have been introduced into, the surface, the actual stainless steel surface or surface having a steel appearance remains visible to the observers/customers. Moreover, the properties of the surface are not determined exclusively by the coating material as in the prior art. Properties such as corrosion resistance, scratch resistance and abrasion resistance are substantially determined by the actual surface of the material (substrate). Owing to the fact that the siloxane is present only within the recesses and the like, the coating, in contrast to the protective lacquer coatings of the prior art, offers only a comparatively small area of attack for an attack from outside, for example mechanical attack. Thus, delamination or flaking off of the coating, as frequently occurs in the prior art, is prevented effectively.

Said and further features of the invention are evident from the description of the example which now follows, in combination with the claims. The individual features can be realized each by itself or in combination with one another.

EXAMPLE

For coating, according to the invention, of plumbing articles, the base body of a so-called single-lever faucet (without top and control part) comprising stainless steel and two base bodies of a shower comprising the plastic ABS (acrylonitrile-butadiene-styrene copolymer) are provided.

The stainless steel surface of the plumbing fixture (single-lever faucet) is brushed and shows the characteristic appearance of such a brushed stainless steel product. The plastic base bodies of the showers comprising ABS are coated with different metal layers. Thus, first a copper layer is present on the plastic part and on top of said copper layer a so-called sulfamate nickel layer (matt nickel), said layers having been applied by electroplating. The nickel surface thus obtained is brushed. Above the brushed nickel layer, a palladium-nickel layer is present in the case of one shower and a nickel-tungsten layer in the case of the other shower. In this way, both showers have a so-called stainless steel appearance which corresponds to that of a brushed stainless steel surface.

The three base bodies thus provided (single-lever faucet, showers) are cleaned in the customary manner and then dried. A solution of octamethylcyclotetrasiloxane in ethanol (30% strength) is then sprayed onto the surfaces of the three base bodies and distributed and rubbed in with the aid of a commercial microfiber cloth. In this way, the structures formed as a result of the brushing, such as recesses, channels, grooves and the like, are coated and filled with the siloxane. No (complete) polymerization of the siloxane to give a polysiloxane takes place. Accordingly, also no cohesive protective lacquer coat forms on the surfaces, which coat would cover both the recesses and the surface areas present between the recesses.

The functionality of the coatings obtained according to the invention is tested in various ways. Thus, tests show that the coated surfaces are insensitive to fingerprints in comparison with uncoated surfaces. If lime-containing water is poured onto the articles coated according to the invention, either no lime spots at all or substantially fewer lime spots form after drying in comparison with uncoated articles. The articles coated according to the invention are also resistant to commercial cleaning agents, such as tile cleaners. Finally, tests shows that water drops on the coated articles run off substantially more easily than from uncoated articles. Thus, the so-called water repellent properties are also improved by the invention.

The invention claimed is:

1. A method for coating plumbing articles, such as plumbing fixtures, which have stainless steel surfaces or surfaces having a stainless steel appearance, which comprises at least one siloxane being applied to at least a part of the surfaces in such a way that substantially only recesses, channels, grooves and the like present in the surfaces are coated or filled with the siloxane.

2. The method as claimed in claim 1, wherein the surfaces are mechanically treated, preferably brushed, before the application of the siloxane.

3. The method as claimed in claim 1, wherein the surfaces are stainless steel surfaces, in particular of a plumbing article produced from stainless steel.

4. The method as claimed in claim 1, wherein the surfaces are nickel-tungsten surfaces or palladium-nickel surfaces, these surfaces preferably having been applied as coatings to a metallic base body or a base body comprising plastic.

5. The method as claimed in claim 1, wherein the siloxane is applied as a sol-gel system to the surfaces.

6. The method as claimed in claim 1, wherein the siloxane is applied in the form of an aqueous or alcoholic solution to the surfaces.

7. The method as claimed in claim 6, wherein the siloxane content of the solution is at least 10% by weight, preferably from 30 to 60% by weight.

8. The method as claimed in claim 1, wherein the siloxane is a cyclic siloxane, preferably octamethylcyclotetrasiloxane.

9. The method as claimed in claim 1, wherein the siloxane is applied to the surfaces and is distributed there over the surfaces, optionally with mechanical pressing.

10. The method as claimed in claim 1, wherein the application and optionally distribution of the siloxane are effected with the aid of a cloth, in particular a microfiber cloth.

11. A plumbing steel article which has stainless surfaces or surfaces having a stainless steel appearance, comprising recesses, channels, grooves and the like present in the surfaces being coated or filled with at least one siloxane.

12. The plumbing article as claimed in claim 11, wherein the surfaces are at least partly mechanically treated, preferably brushed.

13. The plumbing article as claimed in claim 11, wherein the surfaces are stainless steel surfaces, in particular of a plumbing article produced from stainless steel.

14. The plumbing article as claimed in claim 11, wherein the surfaces are nickel-tungsten surfaces or palladium-nickel surfaces, these surfaces preferably being present as coatings on a metallic base body or a base body comprising plastic.

15. The plumbing article as claimed in claim 11, wherein the siloxane is a cyclic siloxane, in particular octamethylcyclotetrasiloxane.

* * * * *